United States Patent
Colby

[15] 3,696,176
[45] Oct. 3, 1972

[54] PROCESS FOR ORGANOPHOSPHORUS VINYL ESTERS PRODUCTION

[72] Inventor: Thomas H. Colby, El Cerrito, Calif. 94530

[73] Assignee: Shell Oil Company, New York, N.Y.

[22] Filed: Aug. 13, 1970

[21] Appl. No.: 63,660

[52] U.S. Cl...................................260/986, 260/957
[51] Int. Cl................................................C07f 9/02
[58] Field of Search.......................................260/986

[56] References Cited

UNITED STATES PATENTS 2,847,469   8/1958   Dawson et al. ........260/986 X

FOREIGN PATENTS OR APPLICATIONS 1,263,748   3/1968   Germany...................260/986

Primary Examiner—Joseph P. Brust
Attorney—Frank R. LaFontaine and Marion W. Western

[57] ABSTRACT

Lower beta, beta-dihalovinyl phosphate diesters are reacted with thionyl chloride in the presence of a salt compound containing cationic nitrogen to yield beta-halovinyl phosphorodichloridates, useful intermediates in the production of higher and/or mixed esters of beta, beta-dihalovinyl phosphates.

5 Claims, No Drawings

PROCESS FOR ORGANOPHOSPHORUS VINYL ESTERS PRODUCTION

BACKGROUND OF THE INVENTION

This invention is an improved process for preparing beta, beta-dihalovinyl phosphorodichloridates, which are useful as intermediates in the production of higher and/or mixed esters of beta, beta-dihalovinyl phosphates, which are superior insecticides (U.S. Pat. No. 3,299,190) and/or anthelmintics (U.S. Pat. application Ser. No. 654,993 filed July 21, 1967). The classic method of preparing such esters, the Perkow reaction, which involves the reaction of an alpha-polyhaloaldehyde with the appropriate mixed trialkyl phosphite, is laborious and inherently inefficient when utilized in the preparation of mixed esters of beta, beta-dihalovinyl phosphates. The conventional methods of preparing the mixed phosphite reactants lack sufficient selectivity, resulting in reaction products which are mixtures of several different mixed phosphites, all of which will react with the polyhaloaldehyde yielding a Perkow reaction product which is contaminated with undesired phosphate esters. The process of this invention circumvents the operational problems encountered with the classic approach by starting with dialkyl phosphate esters which are readily prepared by the Perkow reaction and effectively converts them to phosphorodichloridate intermediates which readily undergo stepwise alcoholysis to yield the desired mixed ester.

DESCRIPTION OF THE PRIOR ART

As shown in U.S. Pat. No. 2,956,073 and U.S. Pat. No. 3,299,190, the conventional method for preparation of beta, beta-dihalovinyl phosphate diesters involves the reaction of the appropriate alpha-polyhaloaldehyde with the appropriate trialkyl phosphite, wherein the alkyl groups can be the same or different. Thus, for example, to prepare methyl butyl 2,2-dichlorovinyl phosphate, chloral would be reacted with dimethyl butyl phosphite. This procedure, however, has several operational drawbacks when utilized in preparing mixed esters of beta, beta-dihalovinyl phosphates. First, it is necessary to prepare the mixed phosphite, which is difficult to prepare and isolate, since with the conventional methods for preparing mixed phosphites, $(RO)_2P(OR_1)$, the final product inevitably appears to be all of the possible phosphites: $(RO)_3P$, $(RO)_2P(OR_1)$, $(RO)P(OR_1)_2$, $(R_1O)_3P$, resulting in lower yield of desired product and difficulty in isolating it. If the desired mixed phosphite is not isolated then all of the phosphites will react with the haloaldehyde yielding a reaction product which is contaminated with other possible mixed phosphates. Due to similarities in physical characteristics, these phosphate contaminants are exceedingly difficult to separate from the desired mixed phosphate. Further, the mixed phosphites must be kept free from all moisture, since even minute amounts of water appear to cause rapid disproportionation into the other possible phosphites. Use of the mixed phosphite requires special precautions to avoid contamination of the phosphite reactant and the reaction mixture by even minute amounts of water.

German Pat. No. 1,263,748 describes a technique for preparing mixed esters of beta-dihalovinyl phosphates, which involves the reaction of a symmetrical dialkyl beta, beta-dihalovinyl phosphate with phosphorus pentachloride optionally in the presence of a catalyst or with thionyl chloride in the presence of dimethylformamide as a catalyst to form a phosphorodichloridate intermediate. This phosphorodichloridate intermediate then undergoes stepwise reaction with the appropriate alcohols, mercaptans, phenols or thiophenols to yield the desired mixed phosphate ester.

Another method of preparing mixed esters of beta-dihalovinyl phosphates is described in Belgium Pat. No. 718,222, wherein the appropriate enol phosphate anhydride is reacted with an alcohol to form the corresponding diester enol phosphate. This method can be utilized in the preparation of mixed esters of beta, beta-dihalovinyl phosphates by reacting anhydrides derived from symmetrical dialkyl beta, beta-dihalovinyl phosphate esters with the appropriate alcohol.

SUMMARY OF THE INVENTION

Attempts to convert beta, beta-dihalovinyl phosphate diesters to their phosphorodichloridate analogs by uncatalyzed reaction with thionyl chloride under rigorous reaction conditions have been unsuccessful. When a beta, beta-dihalovinyl phosphate ester is refluxed in excess thionyl chloride for five hours, no beta, beta-dihalovinyl phosphorodichloridate can be detected in the reaction product.

It has now been discovered that when a beta, beta-dihalovinyl phosphate diester is reacted with thionyl chloride in the presence of a minor amount of a salt compound containing a cationic nitrogen, the beta, beta-dihalovinyl phosphate diester is converted to the beta, beta-dihalovinyl phosphorodichloridate in high yield. Moreover, there are a wide variety of effective catalysts in this class of compounds which are inert to the reactants, thereby conferring the additional advantage of custom selection of a catalyst which will afford high utility and ease of recovery within the reaction and recovery parameters involved. Catalysts can be selected from organic or inorganic salts containing positive nitrogen cations, or from polymeric anion exchange resins wherein the positively charged matrix is made up of quaternary ammonium moieties, to take advantage of solubility and volatility characteristics of the catalysts dependent on the reaction media and the product purification technique involved.

The invention, accordingly, is the improved process for the production of beta, beta-dihalovinyl phosphorodichloridates, which comprises reacting a beta, beta-dihalovinyl phosphate diester with thionyl chloride in the presence of a minor amount of a salt compound containing cationic nitrogen.

DESCRIPTION OF THE PREFERRED EMBODIMENTS

The beta, beta-dihalovinyl phosphate diesters which are suitable for use as reactants in the process of the invention include those diesters which can be readily synthesized using the Perkow reaction. These compounds can be described by the formula

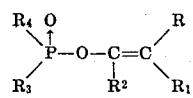

wherein R and $R_1$ are halogen, $R_2$ is a member of a group consisting of hydrogen, alkyl radicals and aryl radicals, $R_3$ and $R_4$ are alkoxy radicals of up to six carbon atoms.

Salt compounds containing positive nitrogen atoms generally are suitable for use in the process of the invention. They may be liquid or solid, and may be organic or inorganic in character. These include quaternary ammonium salts, amine salts, ammonium salts, or polymeric anion exchange materials wherein the positively charged matrix is made up of quaternary ammonium moieties.

Suitable quaternary ammonium salts for use in the process of the invention may be described by the formula

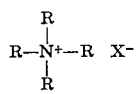

wherein the R groups may be alike or different and represent substituted or unsubstituted alkyl of up to 24 carbon atoms, aryl, alkaryl or aralkyl radicals; X represents a halogen anion, preferably chlorine. The alkyl groups may be branched chain, unbranched, or cyclic, and may, together with the nitrogen, form a heterocyclic ring. The quaternary ammonium salts described as containing alkyl groups include quaternary ammonium salts derived from primary, secondary and tertiary fatty amines. Also suitable for use in the process of the invention are aromatic heterocyclic compounds wherein the hetero atom is a cationic nitrogen which is additionally bonded to an alkyl group. Examples of quaternary ammonium salts which are suitable for use in the process of the invention include tetramethylammonium chloride, ethyltrimethylammonium chloride, methyltriethylammonium chloride, tetraethylammonium chloride, diethyldimethylammonium chloride, tetrapropylammonium chloride, propyltrimethylammonium chloride, tetrabutylammonium chloride, butyltrimethylammonium chloride, ethylhexyldimethylammonium chloride, heptyltrimethylammonium chloride, methylpropylphenylbenzylammonium chloride, methylethylpropylbutylammonium chloride, phenyltrimethylammonium chloride, diphenyldimethylammonium chloride, isopropyltrimethylammonium chloride, cyclohexyltrimethylammonium chloride, methyltrioctylammonium chloride, methyltridodecylammonium chloride, methyltricocoammonium chloride, methylisooctyldicocoammonium chloride, dodecyltrimethylammonium chloride, octadecyltrimethylammonium chloride, trimethylcocoammonium chloride, benzyltrimethylammonium chloride, N-methylpyridinium chloride, N-ethylpyridinium chloride, N,N-dimethyl-3-pyrrolinium chloride, N,N-dimethylpyrrolidinium chloride, N-methylacridinium chloride.

Suitable amine salts are described by the formula

wherein R represents alkyl of up to 24 carbon atoms, aryl, alkaryl or aralkyl; $R_1$ is hydrogen, alkyl of up to 24 carbon atoms, aryl or aralkyl; $R_2$ is hydrogen, alkyl of up to 24 carbon atoms, aryl, alkaryl or aralkyl and X is a halogen anion with chlorine being preferred. Also suitable are hydrohalides of primary, secondary and tertiary amines in which the nitrogen is part of a saturated, unsaturated or aromatic ring system, with the hydrochloride salts being preferred. Examples of amine salts which are suitable for use in the process of the invention include methylamine hydrochloride, diethylamine hydrochloride, tripropylamine hydrochloride, aniline hydrochloride, N-ethyl-N-methylpropylamine hydrochloride, N,N-dimethylbutylamine hydrochloride, N-ethyldiisopropylamine hydrochloride, N-phenylbenzylamine hydrochloride, ethylamine hydrochloride, isobutylamine hydrochloride, benzylamine hydrochloride, cyclohexylamine hydrochloride, octylamine hydrochloride, docosylamine hydrochloride, dioctadecylamine hydrochloride, tricocoamine hydrochloride, N,N-dimethyldodecylamine hydrochloride, triethylamine hydrochloride, pyridine hydrochloride, pyrroline hydrochloride, N-methylpyrrolidine hydrochloride, acridine hydrochloride.

Suitable ammonium salts are those wherein ammonia is combined with a hydrohalide, These include ammonium chloride, ammonium bromide, ammonium fluoride and ammonium iodide, with ammonium chloride being preferred.

Suitable polymeric ion exchange materials include those anion exchange resins wherein the positively charged matrix is made up of quaternary ammonium moieties. These include resins derived from polystyrene-divinylbenzene and trimethylamine or dimethylethanolamine. Examples of commercially available ion exchange resins which are suitable for use in the process of the invention include Amberlite IRA–400, Amberlite IRA–401, Amberlite IRA–402, Amberlite IRA–900, Duolite A–101–D, Duolite ES–111, Dowex 1, Dowex 11, Dowex 21K, Ionac A–540, Amberlite IRA–410, Amberlite IRA–911, Dowex 2, Duolite A–102–D, Ionac A–542, and Ionac A–550.

The selection of a specific positive nitrogen compound, or class of compounds, for use as catalysts in the process of the invention will depend on the catalyst efficiency and the ease by which the catalyst can be recovered and recycled. Catalyst efficiency is derived from the inherent ability of the compound to catalyze the reaction and its effectiveness when utilized in the thionyl chloride-phosphate reaction media. The compounds which can furnish the highest ratio of positive nitrogen atoms for total catalyst weight charged would be inherently the most effective catalysts, since the active moiety of the catalyst appears to be the positive nitrogen. These compounds would include quaternary ammonium salts and amine salts of low molecular weight and the inorganic ammonium salts. Catalyst efficiency is also a function of its solubility in the reaction media. To be most effective as a catalyst for the reaction, the positive nitrogen compound should be in intimate contact with the reactants; therefore, if polar reaction media is utilized, a highly polar catalyst such as quaternary ammonium salts and amine hydrohalides of low molecular weights or an inorganic ammonium halide would be preferred, because of their high solubilities in polar media; whereas, if less polar reaction media is utilized in the process of the invention, then catalysts of higher organic content and less ionic character would be preferred.

The ease with which a catalyst can be recovered for use in subsequent reactions is dependent on differences between it and the reaction product in certain chemical and physical properties which are commonly taken advantage of to effect separations, i.e., boiling points, solubilities, etc., and the ease with which the recovery scheme can be incorporated into the process for recovery of the reaction product. If the phosphorodichloridate product is to be purified by distillation, then preferred catalyst would be those of volatility low enough so as to allow the phosphorodichloridate to be distilled overhead without catalyst contamination, or of volatility high enough to allow the removal of the catalyst by distillation prior to the product purification without loss in product yield; at a minimum, there should be sufficient difference between the boiling points of the catalyst and phosphorodichloridate to allow efficient separation via conventional means. Preferred because of their low volatility, thus allowing the phosphorodichloridate to be distilled overhead without catalyst contamination, are the highly-ionic low-molecular weight quaternary ammonium salts, amine salts and the inorganic ammonium salts wherein the maximum molecular weight is about 300. Additionally, differences in solubility characteristics of the phosphorodichloridate and the catalyst can promote the separation and recovery of the catalyst. For those catalysts which are insoluble in the reaction medium, recovery can be accomplished conveniently by filtration. Polymeric ion exchange resins are preferred for this reason. Other catalysts can be recovered by differences in partition coefficients between the reaction product and the catalyst.

The quaternary nitrogen catalysts which combine the greatest number of desirable properties as to catalyst efficiency and ease of recovery in the thionyl chloride-phosphate reaction system, and are preferred for that reason, are the lower molecular weight quaternary ammonium halide salts and amine hydrohalides wherein the maximum molecular weight is about 300. These compounds furnish high ratios of positive nitrogen atoms for total catalyst weight charged, are sufficiently soluble in the reaction media (excess thionyl chloride), are of low enough volatility to allow the phosphorodichloridate to be distilled overhead without catalyst contamination, and are readily recovered from the reaction bottoms by differences in solubility. Examples of these preferred classes of positive nitrogen compounds include tetramethyl ammonium chloride, triethylamine hydrochloride, methyl pyridinium chloride, tetraethyl ammonium chloride, and trimethylamine hydrochloride.

The reaction incorporating the improvement of the invention may be conveniently conducted by mixing together a beta, beta-dihalovinyl phosphate diester (1 mole), an excess of thionyl chloride (4 moles) and a positive nitrogen compound of the preferred class in the reaction vessel. The excess of thionyl chloride contemplated for use in the reaction functions as a solvent for the reaction mixture and, accordingly, the quantity charged beyond the stoichiometric amount necessary for complete reaction with the phosphate diester may vary with reactor capacity and other process parameters. After addition of the reactants and catalyst, the reaction mixture is heated with stirring to reflux temperatures for 3 to 10 hours. Upon completion of the reaction period, the excess thionyl chloride is flashed overhead at atmospheric or reduced pressure, prior to the isolation of the phosphorodichloridate by flash distillation in a vacuum. The catalyst can be recovered by filtration after dissolving any heavy ends that remain from the distillation in an organic solvent such as acetone or benzene, or, if desired, the catalyst and heavy ends can be totally recycled to the reaction without separation.

The quantity of positive nitrogen salt compound needed to catalyze effectively the thionyl chloride-phosphate reaction, according to the process of the invention, is a minor amount of the reaction mixture. The quantity of the positive nitrogen salt compound required for catalysis will be a function of the ration of positive nitrogen moieties to the total catalyst weight, since the active moiety of the catalyst appears to be the positive nitrogen. Therefore, molar quantity of catalyst in the reaction mixture is dependent on the moles of positive nitrogen in the reaction mixture. The molar quantity of positive nitrogen in the reaction mixture may range as low as 0.02 moles or less up to 0.8 moles or more per mole of phosphate charged, dependent on the compatability of the catalyst with the reaction media. Compatability in this context refers to those physical and chemical characteristics of the catalyst which promote intimacy of contact between the catalyst and the reactants. Typically, for those catalysts in the preferred class, the effective amount of positive nitrogen in the reaction mixture will be about 0.2 moles per mole of phosphate charged. Determination of the effective amount of the positive nitrogen salt may be readily made by those skilled in the art of organic chemistry.

In the following examples, which show the preparation of 2,2-dichlorovinyl phosphorodichloridate, parts by weight ($w$) bear the same relationship to parts by volume as does the kilogram to the liter, and all temperatures are in degrees centigrade.

EXAMPLE I

Preparation of 2,2-dichlorovinyl phosphorodichloridate Using Tetramethyl Ammonium Chloride as a Catalyst Dimethyl 2,2-dichlorovinyl phosphate (1.0 mole, 221 w) and tetramethyl ammonium chloride (0.2 mole, 21.8 w) were charged into a reaction vessel containing thionyl chloride (4 moles, 476 w). The reaction mixture was heated to reflux (70°) and held at reflux, with the addition of external heating, for 3 hours. The reaction mass was then stripped of excess thionyl chloride and other volatile impurities to terminal conditions of 100° and 30 Torr. After removal of the excess thionyl chloride and volatile impurities, the 2,2-dichlorovinyl phosphorodichloridate product was isolated from the solid catalyst and heavy end impurities by distillation in a vacuum to terminal conditions of 130° and 2 Torr. Analysis by gas-liquid chromatography showed the product cut (215.4 w) to contain 96 percent by weight of the desired 2,2-dichlorovinyl phosphorodichloridate (90 percent molar yield).

EXAMPLE II

Preparation of 2,2-dichlorovinyl Phosphorodichloridate Using Recycled Tetramethylammonium Chloride as a Catalyst Dimethyl 2,2-dichlorovinyl phosphate (1 mole, 221 w) and tetramethyl ammonium chloride (0.2 mole, 21.8 w) were charged into a reaction vessel containing thionyl chloride (4 moles, 476 w). The reaction mixture was heated to reflux (70°) and held at reflux, with the addition of external heating, for 3 hours. The reaction mass was then stripped of excess thionyl chloride and other volatile impurities to terminal conditions of 100° and 30 Torr. After removal of the excess thionyl chloride and volatile impurities, the 2,2-dichlorovinyl phosphorodichloridate product was isolated from the solid catalyst and heavy end impurities by distillation in a vacuum to terminal conditions of 130° and 2 Torr. Thionyl chloride (4 moles, 476 w) was then added to the reaction vessel containing the catalyst and heavy end impurities (total weight 32.8 w), and the mixture was stirred until the residue dissolved. Dimethyl 2,2-dichlorovinyl phosphate (1 mole, 221 w) was then charged to the solution and the reaction mixture was heated to reflux (70°) for 3 hours. The reaction mass was then stripped of excess thionyl chloride and other volatile impurities to terminal conditions of 100° and 30 Torr. After removal of the excess thionyl chloride and volatile impurities, the 2,2-dichlorovinyl phosphorodichloridate product was isolated from the solid catalyst and heavy end impurities by distillation in a vacuum to terminal conditions of 130° and 2 Torr. The technique described above was utilized on one more successive preparation of the 2,2-dichlorovinyl phosphorodichloridate with the catalyst and heavy ends being recycled to the reaction. The product yield and purity by gas-liquid chromatography for each of the successive preparations was as follows:

| Tetramethyl-Ammonium Chloride Source | Phosphorodichloridate Yield, % Molar Based on Phosphate Charged | Purity % by Weight |
|---|---|---|
| Fresh | 84 | 97 |
| 1st Recycle | 88 | 97 |
| 2nd Recycle | 94 | 97 |

EXAMPLE III

Following the general procedures set forth in Example I, other quaternary nitrogen compounds were evaluated as catalysts in the preparation of 2,2-dichlorovinyl phosphorodichloridate, and the results are set forth in Table I.

TABLE I

| Catalyst | Moles charged thionyl Chloride | Moles charged 2,2-dichlorovinyl phosphate | Moles of Positive Nitrogen charged per Mole of Phosphate Charged | Reflux Time (hr) | % Molar Yield based on phosphate Charged |
|---|---|---|---|---|---|
| Methyl Pyridinum Chloride | 4.0 | 1.0 | 0.2 | 3 | 80 |
| Triethylamine Hydrochloride | 4.0 | 1.0 | 0.2 | 3 | 75 |
| Ethoquad C/12a) | 4.0 | 1.0 | 0.3 | 4½ | 67 |
| Amberlite IRA 400b) | 4.0 | 1.0 | 0.08 | 5½ | 44 | a)Armour, Inc., trimethylcocoammonium chloride (doubly ethoxylated)
b)Rohm and Haas Company, quaternary ammonium anion exchange resin derived from trimethylamine.

Examples of the stepwise reaction of the beta, beta-dihalovinyl phosphorodichloridates, which are products of the process of the invention described herein, with the appropriate alcohols to yield insecticidally and/or anthelmintically active mixed esters of beta, beta-dihalovinyl phosphates may be found in German Pat. No. 1,263,748, published Mar. 21, 1968.

I claim as my invention:

1. A process for the production of beta, beta-dichlorovinyl phosphorodichloridate by refluxing thionyl chloride with a beta, beta-dichlorovinyl phosphate ester of the formula

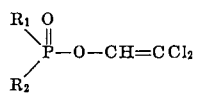

wherein $R_1$ and $R_2$ are alkoxy of up to six carbon atoms, the molar ratio of phosphate to thionyl chloride being about 1 to 4, for a period of about 3 to 10 hours, the reaction being carried out in the presence of a cationic nitrogen-containing catalyst selected from the group consisting of quaternary ammonium salts of the formula

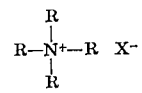

amine salts of the formula

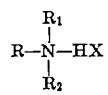

quaternary ammonium salts of the formula

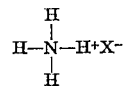

wherein R is unsubstituted alkyl of up to 24 carbon atoms, aryl, alkaryl, or aralkyl; $R_1$ is hydrogen, alkyl of up to 24 carbon atoms, aryl, or aralkyl; $R_2$ is hydrogen, alkyl of up to 24 carbon atoms, aryl, alkaryl, or aralkyl; and X is halogen; and polymeric anion exchange resins wherein the positively charged matrix is made up of quaternary ammonium moieties; the catalyst being present in an amount sufficient to furnish from about 0.02 to about 0.8 moles of positive nitrogen per mole of phosphate.

2. The process of claim 1 wherein the cationic nitrogen-containing catalyst is a quaternary ammonium salt having a molecular weight of up to 300 or an amine salt having a molecular weight of up to 300.

3. The process of claim 2 wherein the salt is a chloride salt.

4. The process of claim 3 wherein the chloride salt is tetramethyl ammonium chloride, triethylamine hydrochloride, or methyl pyridinium chloride.

5. The process of claim 4 wherein the chloride salt is tetramethyl ammonium chloride.

* * * * *